United States Patent [19]

Kajitani

[11] Patent Number: 5,555,145
[45] Date of Patent: Sep. 10, 1996

[54] FLOATING HEAD SLIDER WITH A MAGNETIC HEAD INTEGRATED THEREIN

[75] Inventor: Hiroshi Kajitani, Tokyo, Japan

[73] Assignee: NEC Corporation, Tokyo, Japan

[21] Appl. No.: 292,035

[22] Filed: Aug. 18, 1994

[30] Foreign Application Priority Data

Aug. 20, 1993 [JP] Japan .................................. 5-205946

[51] Int. Cl.$^6$ .............................. G11B 5/60; G11B 5/23; G11B 17/32; G11B 21/20
[52] U.S. Cl. ........................... 360/103; 360/126; 360/119
[58] Field of Search .................................... 360/103, 113, 360/126, 119

[56] References Cited

U.S. PATENT DOCUMENTS

| | | | |
|---|---|---|---|
| 4,066,312 | 1/1978 | Faure | 339/48 |
| 5,068,759 | 11/1991 | Matsuzaki | 360/103 |
| 5,111,351 | 5/1992 | Hamilton | 360/104 |
| 5,166,845 | 11/1992 | Thompson et al. | 360/103 |
| 5,175,658 | 12/1992 | Chang et al. | 360/103 |
| 5,187,623 | 2/1993 | Ibaraki | 360/103 |
| 5,264,980 | 11/1993 | Mowry et al. | 360/113 |
| 5,270,895 | 12/1993 | Ruigrok et al. | 360/126 |

FOREIGN PATENT DOCUMENTS

| | | |
|---|---|---|
| 2-101688 | 4/1990 | Japan . |
| 4-356765 | 12/1992 | Japan . |
| 5-120659 | 5/1993 | Japan . |

OTHER PUBLICATIONS

J. P. Lazzari and P. Deroux–Dauphin, "A New Thin Film Head Generation IC Head", IEEE Transactions On Magnetics, vol. 25, No. 5, Sep. 1989, pp. 3190–3193.

H. Hamilton, R. Anderson, and K. Goodson, "Contact Perpendicular Recording On Rigid Media", IEEE Transactions On Magnetics, vol. 27, No. 5, Nov. 1991, pp. 4921–4926.

*Primary Examiner*—A. J. Heinz
*Assistant Examiner*—Adriana Giordana
*Attorney, Agent, or Firm*—Sughrue, Mion, Zinn, Macpeak & Seas

[57] ABSTRACT

A floating head slider includes a slider main body and a read/write element. The slider main body has an air bearing surface opposing a magnetic disk and a plurality of rails which are formed on the air bearing surface in an air flow-in direction and is in contact with the magnetic disk in a non-floating state. The air bearing surface receives an air flow generated by rotation of the magnetic disk, thereby causing the slider main body to float from a magnetic disk surface. The read/write element is formed in the slider substantially parallelly to the air bearing surface and has a front gap portion, bent to be formed at an air flow trailing edge portion of the air bearing surface, for electromagnetically reading/writing information.

12 Claims, 10 Drawing Sheets

FLOATING HEAD SLIDER WITH A MAGNETIC HEAD INTEGRATED THEREIN

BACKGROUND OF THE INVENTION

The present invention relates to the structure of the head portion of a magnetic disk apparatus and, more particularly, to a floating head slider integrated with a magnetic head and a method of manufacturing the floating head slider.

In the head portion of a magnetic disk device, a conventional magnetic head mounting floating head slider having a taper at an air flow leading edge and two rails which are formed on both sides of the slider in the widthwise direction parallel to the longitudinal direction has been basically used. It is known to build floating head sliders with the following characteristic features, high air film rigidity, mechanical workability using simple rail shapes, floating amount design facilitation.

Manufacturing methods for this slider are roughly classified into two types according to the types of read/write elements. In one manufacturing method, a conductive wire is wound onto a ring consisting of ferrite or the like in the shape of a coil, and a magnetic head called a ring type magnetic head having a gap partially formed therein is used. According to this method, after forming rails of a slider, a ring type magnetic head adheres to the air flow trailing edge face of the rail, and finally, the slider is polished to accurately position the magnetic head.

In the other method, a magnetic head called a thin-film magnetic head in which the same arrangement as that of the above magnetic head is formed to have a flat shape is used. Magnetic heads are formed by a thin-film process on a substrate serving as a base material of sliders, the substrate is cut along the rows, and rails are formed in each slider.

The second method is advantageous to decrease the sizes of a magnetic head and a slider and manufacture highly accurate, uniform magnetic heads. In addition, since a magnetic head formed according to the second method can be stacked and formed together with a signal reproducing head (MR head), this manufacturing method is popularly used at present.

Along with the recent development of a more compact magnetic disk apparatus having high-speed access and a high recording density, a slider must realize a small floating amount of 0.1 μm or less while the slider has a small size, a light weight, and a small load. It is important to design a rail shape which has high air film rigidity and forms a pressure distribution for improving disk tracking characteristics.

In recent years, there has been a trend to change head access mechanisms from linear head access to rotary head access mechanisms to improve high-speed access. In this case, an angle (yaw angle) between the longitudinal direction of the slider and the tangential direction of a track on a disk continuously changes during access. For this reason, in a two-rail slider, pressures generated by the rail surfaces change considerably, and the balance between these pressures is lost, thereby causing the roll angle and the pitch angle to vary. Therefore, the floating stability of the slider must be assured in consideration of an air flow speed which increases toward the outer periphery of the disk, setting of the yaw angle, the center of a load acting on the slider.

In addition, at present, in many magnetic disk apparatuses, a start/stop scheme called a CSS (Contact Start Stop) in which the rail surfaces of a slider are brought into sliding contact with a disk is employed. In this case, in order to reduce damage to the magnetic head and the disk surface caused by intermittent sliding contact between the slider and the disk, the shape of the slider must be designed to shorten the time required for interface sliding and to reduce the probability of damage to the magnetic head and the disk surface.

As a means for solving the above problems, conventional sliders having a complex rail surface shape, and a complex recess shape such as those disclosed in Japanese Patent Laid-Open Nos. 2-101688 and 4-356765 have been developed. Since the rail shapes of these sliders are difficult to form by normal machining, these rail shapes are normally formed by wet or dry etching using masks. In this case, since a magnetic head is formed first, the magnetic head must be protected during etching to form the rails and a recess. Some slider material requires a long etching time, and magnetic head protecting performance is degraded, thereby causing a decrease in yield.

SUMMARY OF THE INVENTION

It is an object of the present invention to provide a floating head slider having improved magnetic head protecting performance during etching to form rails and a recess and a method of manufacturing the floating head slider.

It is another object of the present invention to perform the formation of a magnetic head and the etching for forming rails and a recess in the same planar process, thereby providing a highly accurate floating head slider having a high yield and a method of manufacturing the same.

In order to achieve the above objects, according to the present invention, there is provided a floating head slider comprising a slider main body, having an air bearing surface opposing a magnetic disk and a plurality of rails which are formed on the air bearing surface in an air flow-in direction and are in contact with the magnetic disk in a non-floating state, the air bearing surface receiving an air flow generated by rotation of the magnetic disk, thereby causing the slider main body to float from a magnetic disk surface, and a read/write element formed in the slider substantially parallel to the air bearing surface and having a front gap portion, bent to be formed at an air flow trailing edge portion of the air bearing surface, for electromagnetically reading/writing information.

DESCRIPTION OF THE PREFERRED EMBODIMENTS

Figure 14A:
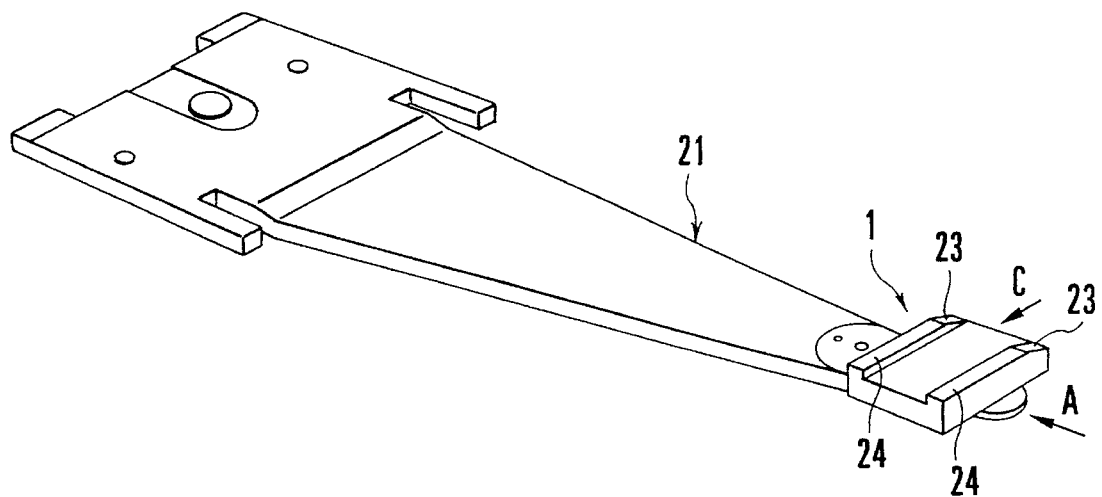
FIG. 14A is a perspective view showing a head portion for explaining a floating head slider according to the present invention.
Figure 14B:
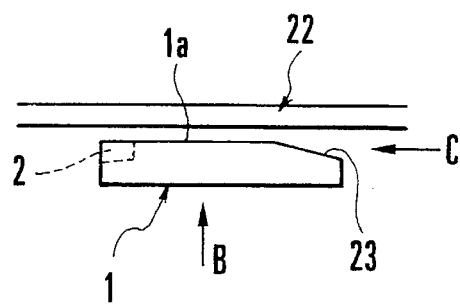
FIG. 14B is a view showing the floating head slider shown in FIG. 14A when viewed from the direction indicated by an arrow A in FIG. 14A.

A floating head slider according to the present invention will be described below with reference to the accompanying drawings. FIG. 14A shows a head portion for explaining a floating head slider according to the present invention, and FIG. 14B shows the floating head slider shown in FIG. 14A when viewed from the direction indicated by an arrow A in FIG. 14A. Referring to FIGS. 14A and 14B, a magnetic disk apparatus has, at its head portion, a read/write element 2 for recording information on a magnetic disk and a slider 1 for causing this read/write element to float with a very narrow spacing between the read/write element and the magnetic disk. The slider 1 is mounted at the distal end portion of a load beam 21 supported by a carriage, and is loaded by the load beam 21 in a direction to bring the slider 1 into contact with a magnetic disk 22 as indicated by an arrow B. The slider 1 has a taper 23 formed on the front edge side of an air bearing surface 1a opposing the magnetic disk 22, and the taper 23 takes in an air flow C generated by rotation of the magnetic disk 22. The slider 1 has two parallel rails 24 each having a predetermined shape and extending from the front edge to the rear edge along the side edges. In FIGS. 14A and 14B, the taper 23 is formed at the front end portions of the rails 24. In a non-floating state, the rails 24 of the slider 1 are in sliding contact with the magnetic disk 22 set in a rotating state. The read/write element 2 is arranged at the rear edge portion of the rail 24 of the slider 1 to oppose the magnetic disk 22, as will be described later.

In rotation of the magnetic disk 22, the slider 1 arranged as described above takes in the air flow C from the taper 23 into the space between the magnetic disk 22 and the air bearing surface 1a to float from the magnetic disk 22. At the same time, the slider 1 causes the read/write element 2 to come close to the magnetic disk 22 in a non-contact state, thereby magnetically reading/writing information.

Figure 1:
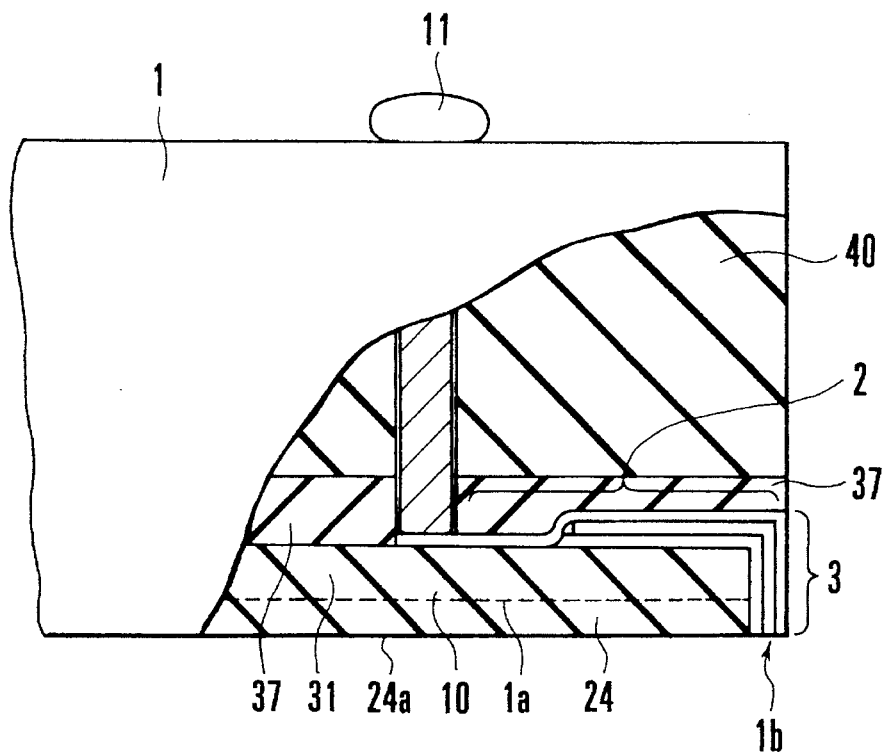
FIG. 1 is a cutaway side view showing the rear edge portion of a floating head slider according to the first embodiment of the present invention.

FIG. 1 shows the rear edge portion of the slider 1 shown in FIGS. 14A and 14B according to the first embodiment of the present invention. Referring to FIG. 1, inside the slider 1, the read/write element 2 which is positioned at an arbitrary position on the magnetic disk 22 and records and reproduces information, is formed on a rail forming substrate 31 at the rear edge portion of the slider 1 by a thin-film technique. The read/write element 2 is stacked and formed parallel to the air bearing surface 1a of the slider 1 or stacked and formed at a predetermined inclination angle corresponding to a floating angle of the slider 1 with respect to the magnetic disk 22, and the read/write element 2 is bent to expose a reading/writing front gap portion 1b at the air flow trailing edge of the rail surface 24a of the rail 24 formed on the slider 1. Reference numeral 10 denotes a contact hole; 11, a connection signal line which consists of a conductor filled in the contact hole 10 and connects the read/write element 2 to a circuit outside the slider 1; a rail forming substrate 31 having the rails 24 formed thereon; 37, a flattening film 37 for flattening the rail forming substrate 31 including the read/write element 2; and 40, a base material substrate of the slider 1 having a through hole 10 formed therein.

According to the above arrangement, since the main part of the read/write element 2 is stacked and formed in the slider 1, the read/write element 2 is not etched during etching to form the rails 24 of the slider 1. Note that, referring to FIG. 1, a pole portion 3 of the read/write element 2 is exposed on the end face of the rear edge of the slider 1. However, as described later, the pole portion 3 is protected by the constituent material of the slider 1 in manufacturing the slider 1, and the pole portion 3 is individually cut and polished in the final step to obtain the arrangement in FIG. 1. For this reason, the read/write element 2 is not etched when the rails 24 are formed.

Figure 2:
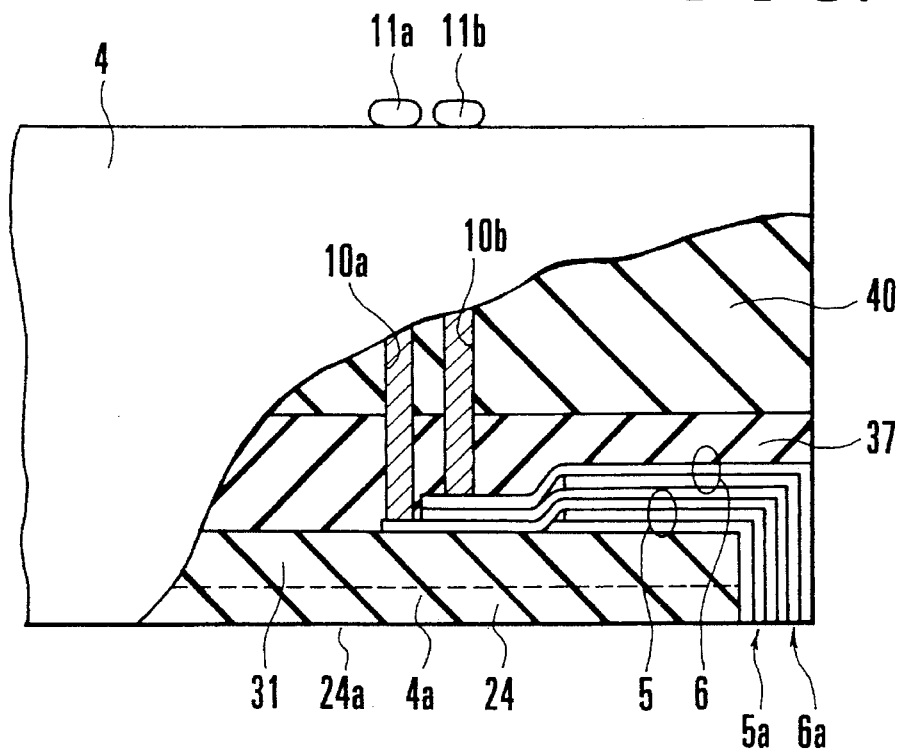
FIG. 2 is a cutaway side view showing the rear edge portion of a floating head slider according to the second embodiment of the present invention.

FIG. 2 shows the rear edge portion of a floating head slider according to the second embodiment of the present invention. Note that the same reference numerals as in FIGS. 14A and 14B and FIG. 1 denote the same parts in the following embodiment, and a description thereof will be omitted. Referring to FIG. 2, inside a slider 4, a reproducing MR (magnetoresistive) head 5 using a magnetoresistive effect and a recording inductive head 6 are sequentially stacked on a rail forming substrate 31 at the rear edge portion of the slider 4. The MR head 5 and the inductive head 6 are bent to expose the front gap portions thereof at the air flow trailing edge on a rail surface 24a of the rail 24 formed on the slider 4. Although the MR head 5 and the inductive head 6 may be functionally stacked in an order reverse to the above order, the inductive head 6 is formed on the MR head 5 because a high degree of flatness can be obtained when the MR head 5 is formed first. A reason why the MR head 5 is used is as follows. That is, although the inductive head 6 can cause an arbitrary current to flow in a recording mode, a reproduction output is obtained by a magnetic flux density on a magnetic disk and the speed of the head traversing the magnetic flux in a reproducing mode. For this reason, the magnetic flux density on the magnetic disk considerably decreases with an increase in recording density, thereby degrading reproducing precision. Reference numeral 4a denotes an air bearing surface; 10a and 10b, contact holes respectively formed in correspondence with the MR head 5 and the inductive head 6; and 11a and 11b, signal lines respectively filled in the contact holes 10a and 10b and connected to the MR head 5 and the inductive head 6.

Floating head sliders according to the present invention will be described below with reference to the accompanying drawings. FIG. 1 shows the rear edge portion of a floating head slider according to the first embodiment of the present invention.

Figure 3:
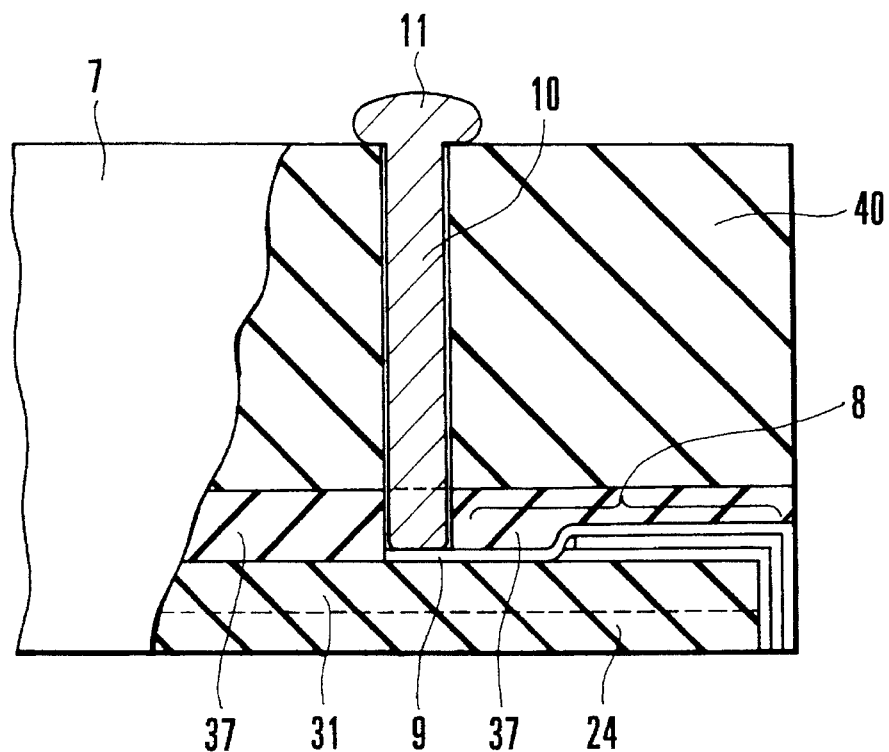
FIG. 3 is a cutaway side view showing the rear edge portion of a floating head slider according to the third embodiment of the present invention.

FIG. 3 shows the rear edge portion of a floating head slider according to the third embodiment of the present invention. In a slider 7, since a read/write element 8 is formed inside the slider 7, a signal line must be externally extracted from a lead line pad 9 having the read/write element 8 connected thereto. For this reason, a contact hole 10 is formed in the direction of thickness of the slider 7, and a connection signal line 11 is extracted from the rear surface of the slider 7.

Figure 4:
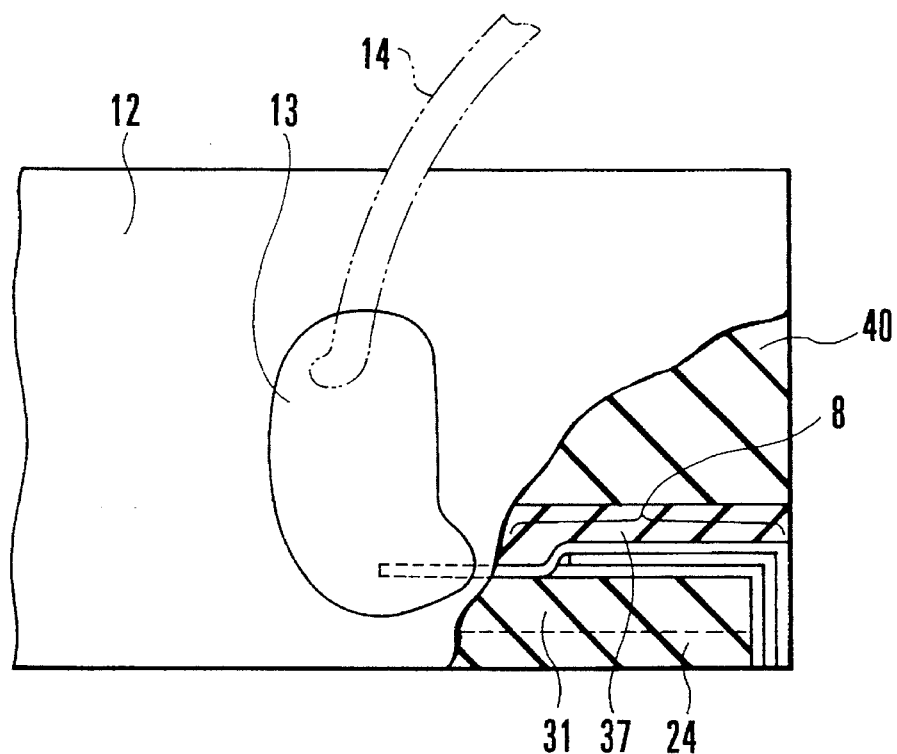
FIG. 4 is a cutaway side view showing the rear edge portion of a floating head slider according to the fourth embodiment of the present invention.

FIG. 4 shows the rear edge portion of a floating head slider according to the fourth embodiment of the present invention. In a slider 12, a lead line pad 13 having a read/write element 8 connected thereto is formed to be exposed on a side surface of the slider 12, and a signal line 14 is extracted from the lead line pad 13 on the side surface after the cutting process. Referring to FIG. 4, reference numeral 37 denotes a flattening film.

Figure 5:
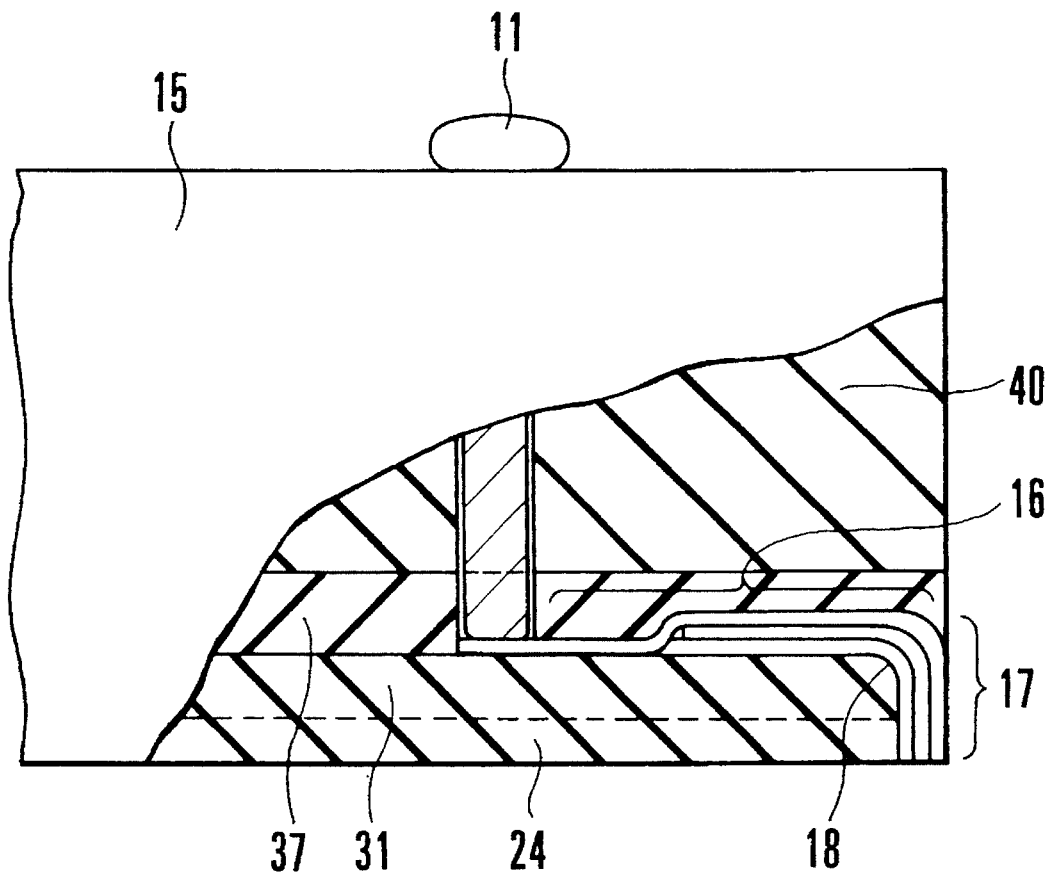
FIG. 5 is a cutaway side view showing the rear edge portion of a floating head slider according to the fifth embodiment of the present invention.

FIG. 5 shows the rear edge portion of a floating head slider according to the fifth embodiment of the present invention. As shown in FIG. 5, since a step portion 18 of a front end pole 17 of a read/write element 16 is formed to have a curved surface, a probability of disconnection of the step portion 18 and a probability of formation of a film having an non-uniform thickness can be considerably decreased when the read/write element 16 is formed.

A method of manufacturing the floating head slider shown in FIG. 1 will be described below. This manufacturing method includes six (6), which steps will be sequentially described below.

Figure 6A:
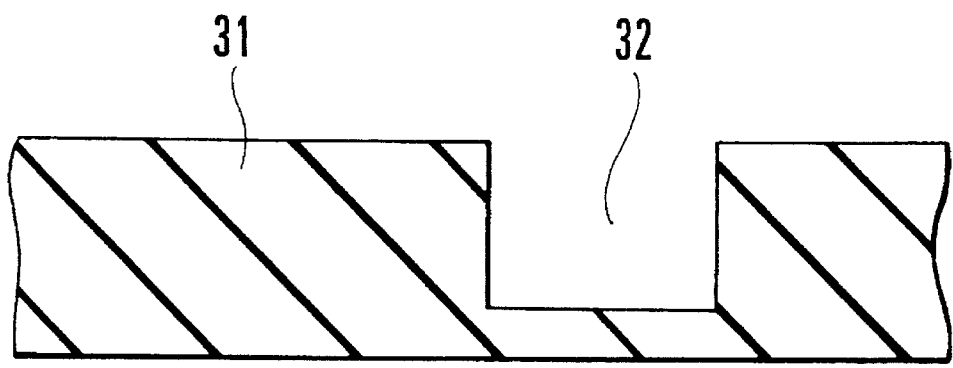
FIG. 6A is a sectional view showing the first step of the floating head slider shown in FIG. 1.
Figure 6B:
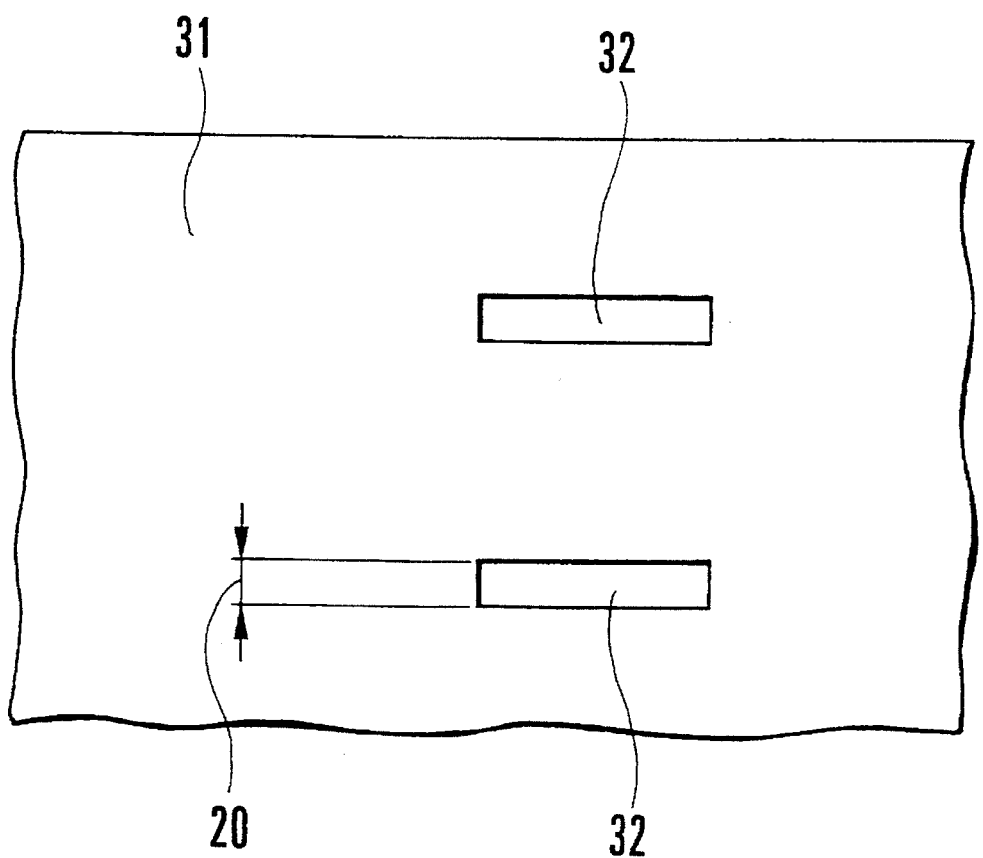
FIG. 6B is a plan view showing the first step in FIG. 6A.

FIGS. 6A and 6B show the first step, i.e., the step of forming grooves 32, for forming the front end portions of the read/write elements 2, in the substrate 31 on which the rails 24 of the sliders 1 are to be formed. The substrate 31 is constituted by one wafer-like substrate to be cut into the plurality of sliders 1.

In this step, in order to form the front end portions of the read/write elements 2, a plurality of recessed grooves 32 each having a width corresponding to a track width 20 of a disk are aligned and formed by etching in the substrate 31 on which the rails 24 of the sliders 1 are to be formed.

Figure 7A:
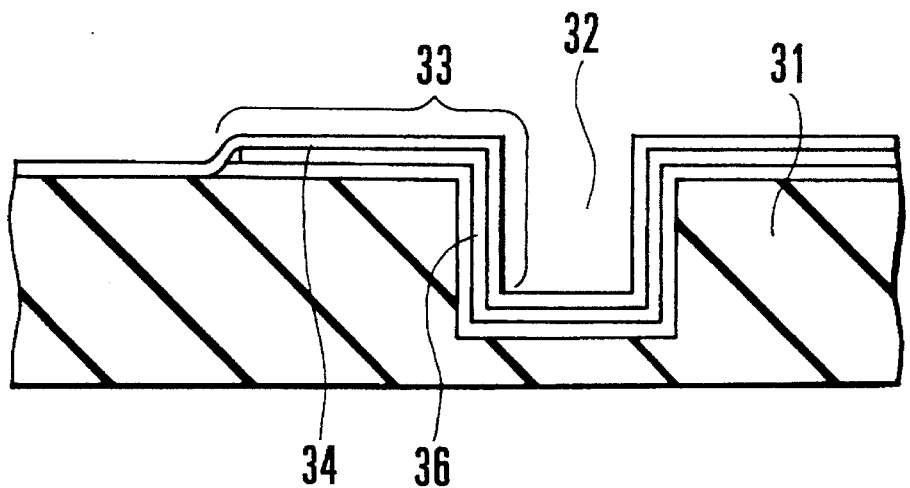
FIG. 7A is a sectional view showing the second step of the floating head slider shown in FIG. 1.
Figure 7B:
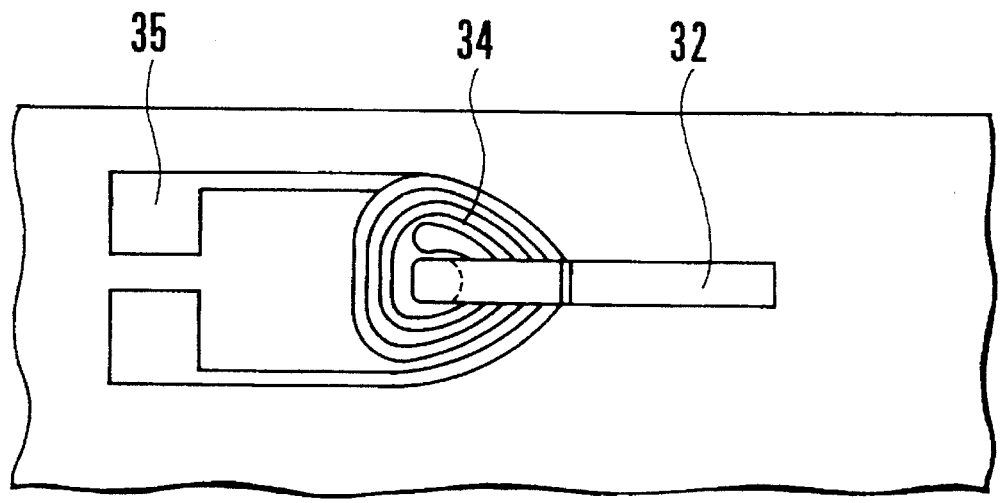
FIG. 7B is a plan view showing the first step in FIG. 7A.

FIGS. 7A and 7B show the second step. In this step, a read/write element 33 (the element 2 in FIG. 1) is formed on the rail forming substrate 31. When a thin-film magnetic head is to be formed, a coil portion 34 and lead line pads 35 are formed on the upper surface of the rail forming substrate 31, and a pole portion 36 is formed on the surface of each recessed groove 32 parallel to the alignment direction of the recessed grooves 32.

Figure 8:
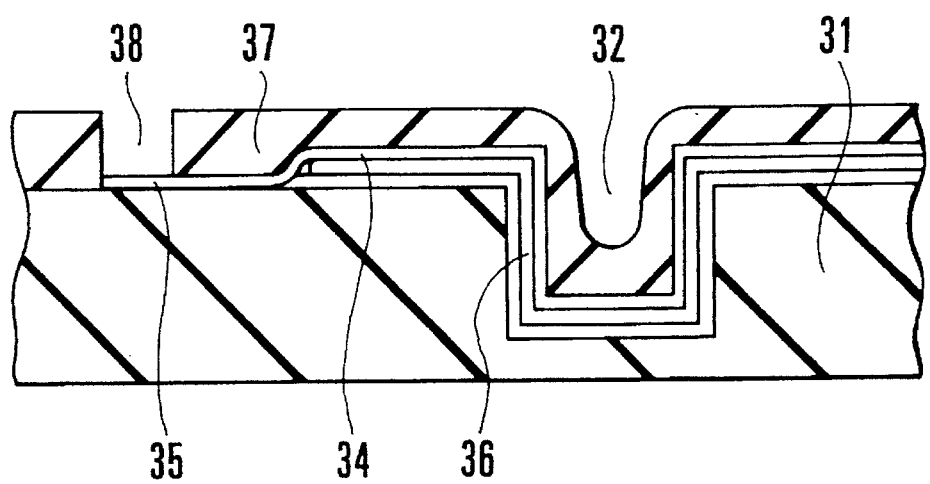
FIG. 8 is a sectional view showing the third step of the floating head slider shown in FIG. 1.

FIG. 8 shows the third step. In this step, an uneven surface formed on the rail forming substrate 31 during the formation 8 the read/write element is flattened. Although this flattening is performed by depositing the flattening film 37 on the upper surface of the rail forming substrate 31, the recessed grooves 32 need not be necessarily deposited with the flattening film 37. In addition, the material of the flattening film 37 requires a high adhesion strength with a slider base material used in the next step, and the flattening film 37 is formed on the lead line pad 35. For this reason, the flattening film 37 must be an insulating film. Thereafter, a lead line extraction hole 38 is formed above the lead line pad 35.

Figure 9:
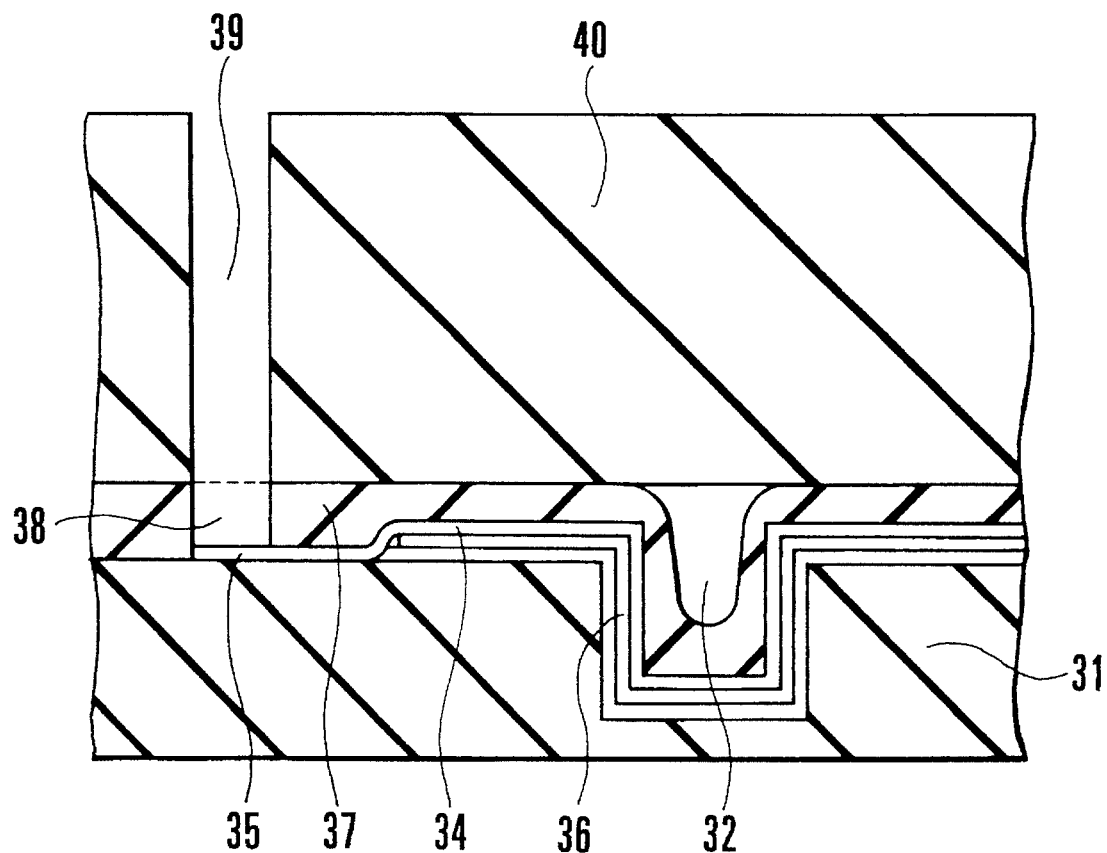
FIG. 9 is a sectional view showing the fourth step of the floating head slider shown in FIG. 1.

FIG. 9 shows the fourth step. In this step, a slider base material substrate 40 in which a lead line extraction hole 39 is formed in advance adheres to the surface of the flattening film 37 deposited in the previous step using the lead line extraction hole 38 formed in the flattening film 37 as a positioning mark.

Figure 10A:
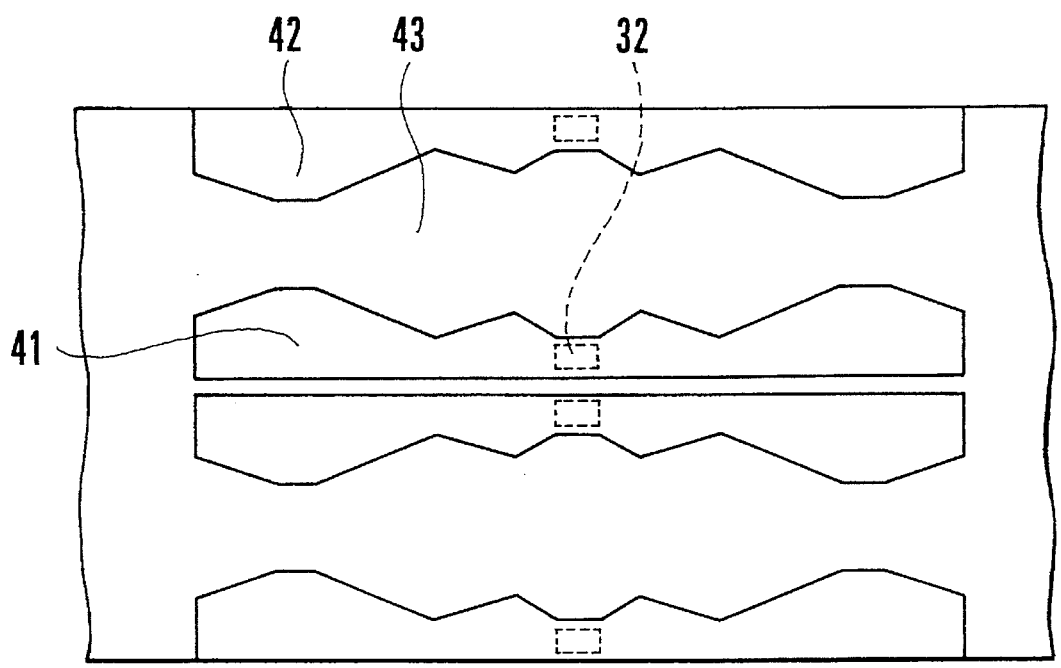
FIG. 10A is a plan view showing the fifth step of the floating head slider shown in FIG. 1.
Figure 10B:
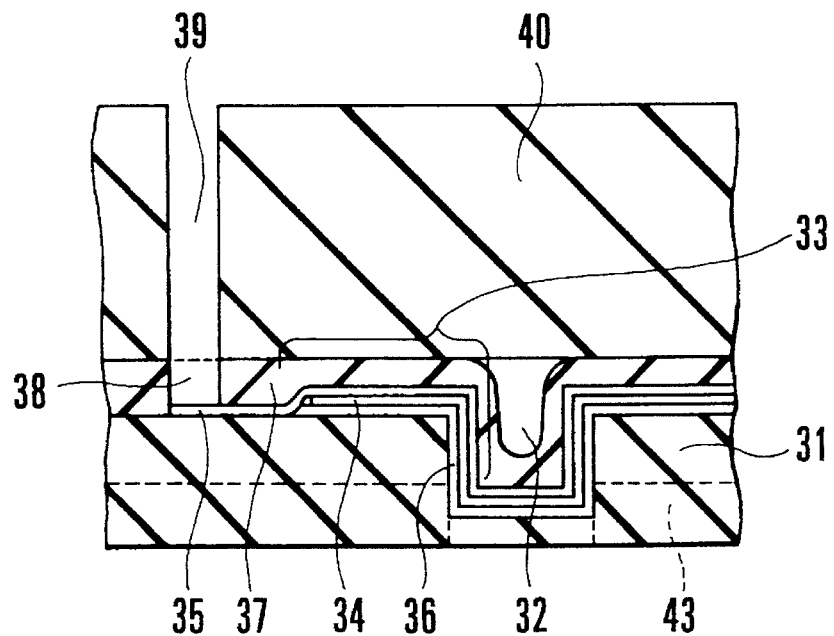
FIG. 10B is a sectional view showing the fifth step in FIG. 10A.

FIGS. 10A and 10B show the fifth step. In this step, the rail forming substrate 31 is etched to form a recess 43 for forming rails 41 and 42 (the rails 24 in FIG. 1) to constitute an air bearing surface. At this time, the read/write element 33 is formed between the rail forming substrate 31 and the base material substrate 40 and entirely protected from a surface subjected to etching. For this reason, when the rail forming substrate 31 is etched, the read/write element 33 is not degraded.

Figure 11A:
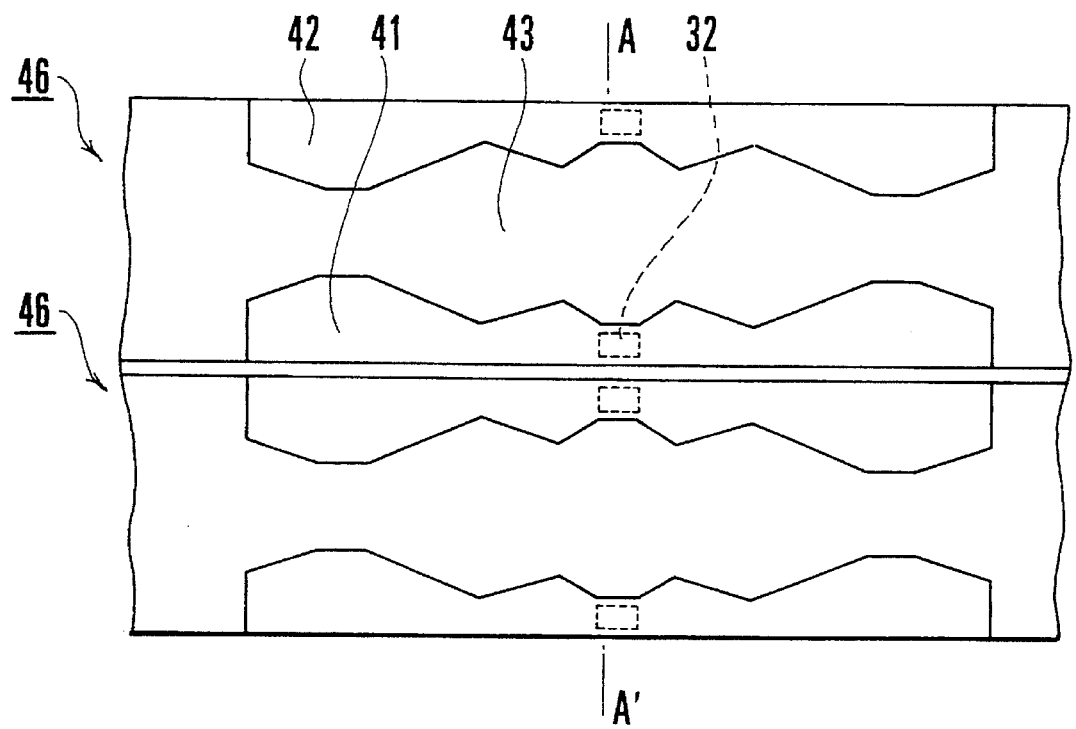
FIG. 11A is a plan view showing the sixth step of the floating head slider shown in FIG. 1.
Figure 11B:
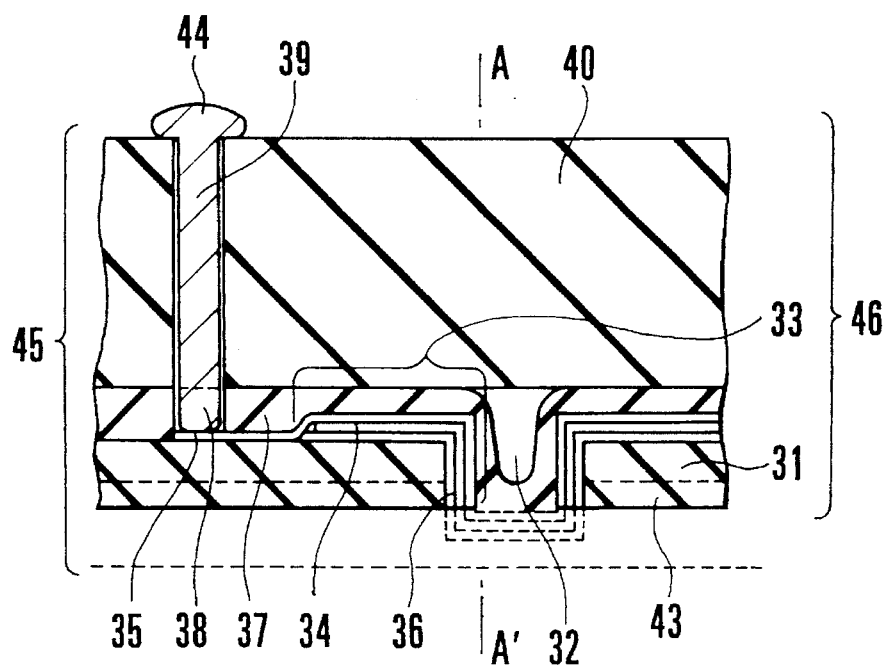
FIG. 11B is a sectional view showing the sixth step in FIG. 11A.

FIGS. 11A and 11B show the sixth step. In this step, the lead line extraction holes 38 and 39 are filled with a conductive material 44, sliders 46 (the slider 1 in FIG. 1) are formed one by one by cutting a wafer-like substrate 45. The portion of the read/write element 33 is cut parallel to the pole portion 36 (the pole portion 3 in FIG. 1) along an A–A' line in FIG. 11A or 11B in the direction of thickness of the substrate 45. Finally, the rail surfaces of the rails 41 and 42 (the rails 24 in FIG. 1) are polished, and the unnecessary portions of the pole portion 36 and the front gap portion of the read/write element 33 are removed, thereby completing the manufacture of the sliders 46.

Figure 12:
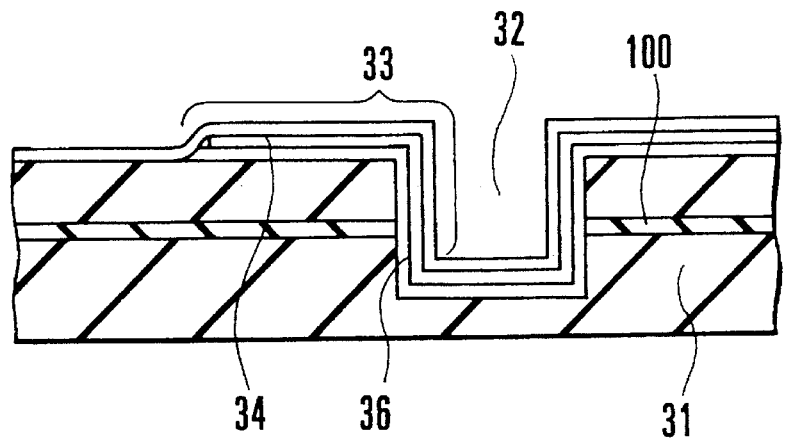
FIG. 12 is a sectional view showing still another step of the floating head slider shown in FIG. 1.
Figure 13:
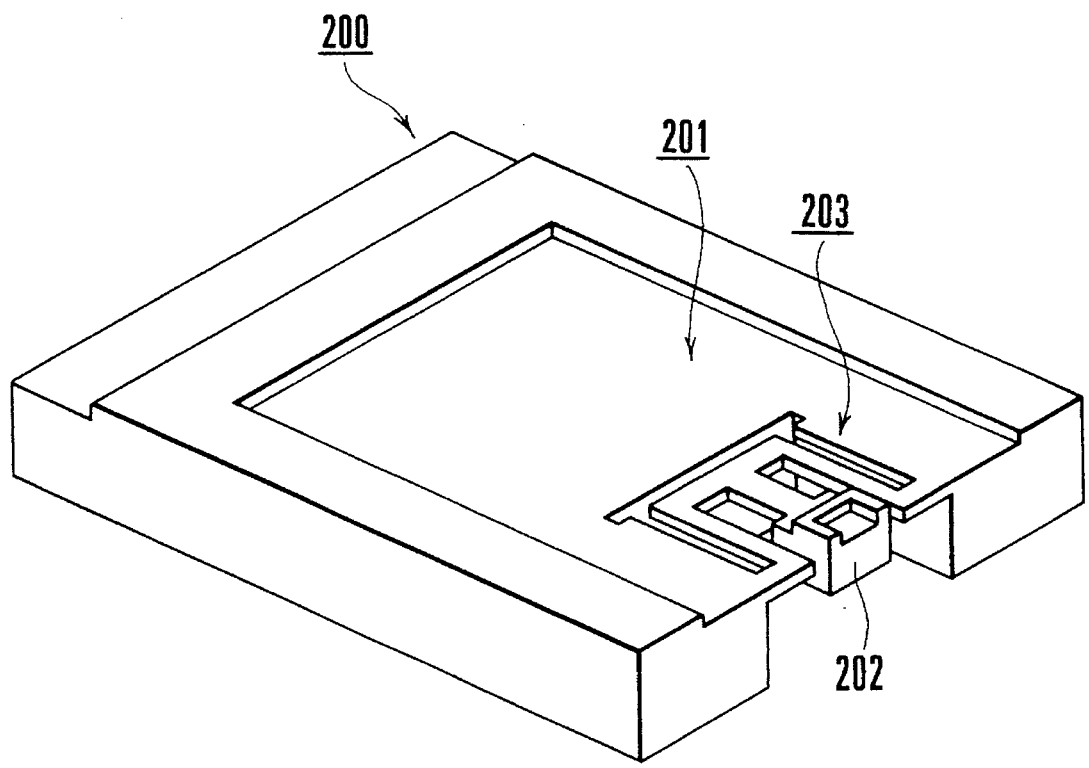
FIG. 13 is a perspective view showing a composite floating head slider according to the present invention.

FIG. 12 shows the step of forming an etching stop layer for forming rails and a recess. Before the recessed grooves 32 for forming the front end portions of the read/write elements 33 shown in FIG. 10 are formed, as shown in FIG. 12, a film 100 which has an etching rate considerably lower than that of the rail forming substrate 31 and serves as an etching stop layer is deposited in advance. In an etching operation for forming a recess, the etching operation is stopped at the film 100. For this reason, an etching depth can be easily, reliably controlled. This is specially effective in a case wherein a negative pressure considerably changes due to the depth of a recess in a negative pressure slider.

The method of manufacturing a floating head slider has superiority in manufacturing an integrated composite floating head slider 200 which requires a long etching time and a large number of times of etching and is constituted by integrating a main slider 201, a sub slider 203, and a suspension 202.

The embodiments of the present invention have been described above. In each of these embodiments, materials to be used, a substrate adhering method, an etching method, a masking method, cutting and polishing methods, and the like may be changed without departing from the spirit and scope of the present invention. The present invention is not limited to the above scope.

As has been described above, in a floating head slider according to the present invention and a method of manufacturing the same, the step of forming rails and a recess in a floating head slider and the step of forming a magnetic head can be preformed by the same planar process, and the magnetic head can be effectively protected from etching. For this reason, floating heads can be manufactured at a high yield and a low cost. In addition, when an etching stop layer is formed in a rail forming substrate in advance, the depth direction of the recess can be easily controlled, and a highly accurate floating head slider can be manufactured.

What is claimed is:

1. A floating head slider comprising:

a slider main body, having an air bearing surface opposing a magnetic disk and a plurality of rails which are formed on said air bearing surface in an air flow-in direction, said air bearing surface receiving an air flow generated by rotation of said magnetic disk, thereby causing said slider main body to float from a magnetic disk surface, said slider body further having a rear edge surface which meets said air bearing surface at a trailing edge of said air bearing surface; and a read/write element formed in said slider, said read/write element being substantially parallel to said air bearing surface and being bent at one end to form a front gap portion located at the trailing edge of said air bearing surface, for electromagnetically reading/writing information, wherein a pole portion of said read/write element is exposed on the rear edge surface of said slider main body and continues to said air bearing surface.

2. A slider according to claim 1, wherein said read/write element has a multilayered structure constituted by a recording element and a reproducing element.

3. A slider according to claim 2, wherein said recording element and said reproducing element constitute an inductive head and a magnet-resist head, respectively, and said inductive head is formed directly on said magnet-resist head.

4. A slider according to claim 1, further comprising a lead line connected to said read/write element and extracted from a hole formed in a direction of thickness of said slider main body to a rear surface of said slider.

5. A slider according to claim 1, further comprising a lead line connected to said read/write element, formed parallel to said read/write element and extracted to a side surface of said slider.

6. A slider according to claim 1, further comprising a rail forming substrate including a first surface having said rails formed thereon and constituting said air bearing surface, a second surface having said read/write element formed thereon, said read/write/element having a step portion formed on said second surface and curved at a portion where said read/write element is bent.

7. A slider according to claim 1, wherein said read/write element is stacked and formed in said slider main body by a thin-film technique.

8. A slider according to claim 1, wherein said read/write element is formed at a predetermined inclination angle with respect to the air bearing surface.

9. A slider according to claim 8, wherein said predetermined inclination angle corresponds to a floating angle of said slider main body with respect to said magnetic disk.

10. A floating head slider as recited in claim 1 wherein, said plurality of rails are in contact with said magnetic disk in a non-floating state.

11. A floating head slider comprising:

a rail forming substrate having a first surface for constituting an air bearing surface opposing a magnetic disk to receive an air flow generated by rotation of said magnetic disk to generate a floating force, a second surface, and a rear edge surface which meets said first surface at a trailing edge thereof;

a plurality of rails which are formed on said first surface of said rail forming substrate in an air flow-in direction;

a read/write element formed on said second surface at a rear edge portion of said slider, said read/write element being substantially parallel to said first surface and being bent at one end to form a front gap portion for electromagnetically reading/writing information, said front gap portion being exposed at the trailing edge of said first surface, wherein a pole portion of said read/write element is exposed on the rear edge surface of said slider main body and continues to said air bearing surface;

a flattening film formed on said second surface of said rail forming substrate and said read/write element;

a slider base material substrate stacked on said flattening film;

a through hole formed in said flattening film on a lead line pad of said read/write element and said slider base material substrate; and a lead line connected to said read/write element and extracted from said through hole to a rear surface of said slider.

12. A floating head slider as recited in claim 11 wherein, said plurality of rails are in contact with said magnetic disk in a non-floating state.

* * * * *

UNITED STATES PATENT AND TRADEMARK OFFICE
CERTIFICATE OF CORRECTION

PATENT NO. : 5,555,145
DATED : September 10, 1996
INVENTOR(S) : Hiroshi KAJITANI It is certified that error appears in the above-indentified patent and that said Letters Patent is hereby corrected as shown below:

Column 4, line 12, before "a rail" insert --31,--.

Column 4, line 14, after "substrate" delete "31".

Column 5, line 49, delete "8" and insert --of--.

Signed and Sealed this

Twenty-fourth Day of December, 1996

Attest:

BRUCE LEHMAN

*Attesting Officer*   *Commissioner of Patents and Trademarks*